United States Patent
Hasson et al.

(10) Patent No.: US 9,967,331 B1
(45) Date of Patent: *May 8, 2018

(54) METHOD, INTERMEDIATE DEVICE AND COMPUTER PROGRAM CODE FOR MAINTAINING PERSISTENCY

(71) Applicant: F5 Networks, Inc., Seattle, WA (US)

(72) Inventors: Uri Hasson, Kiryat Ono (IL); Yiftach Shoolman, Modi'in (IL)

(73) Assignee: F5 Networks, Inc., Seattle, WA (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/791,016

(22) Filed: Jul. 2, 2015

Related U.S. Application Data

(63) Continuation of application No. 12/271,903, filed on Nov. 16, 2008, now Pat. No. 9,106,606, which is a
(Continued)

(51) Int. Cl.
*G06F 15/16* (2006.01)
*G06F 15/173* (2006.01)
(Continued)

(52) U.S. Cl.
CPC .......... *H04L 67/1027* (2013.01); *H04L 67/02* (2013.01); *H04L 67/1004* (2013.01);
(Continued)

(58) Field of Classification Search
CPC ....... H04L 67/02; H04L 67/34; H04L 69/161; H04L 67/1014; H04L 67/1027; H04L 69/329
(Continued)

(56) References Cited

U.S. PATENT DOCUMENTS

| 3,689,872 A | 9/1972 | Sieracki |
| 3,768,726 A | 10/1973 | Hale et al. |

(Continued)

OTHER PUBLICATIONS

Shun-Yun Hu, Jui-Fa Chen and Tsu-Han Chen, "VON: a scalable peer-to-peer network for virtual environments," in IEEE Network, vol. 20, No. 4, pp. 22-31, Jul.-Aug. 2006.*

(Continued)

*Primary Examiner* — Taylor Elfervig
(74) *Attorney, Agent, or Firm* — John W. Branch; Lowe Graham Jones PLLC

(57) ABSTRACT

A method for maintaining server persistency, including: (a) receiving, by an intermediate entity, a first session request from client to receive a service from a server out of a plurality of servers that are connected to the intermediate entity; (b) selecting a server out of the plurality of servers and directing to the selected server information indicative of the first session request; (c) receiving a response of the selected server to the information indicative of the first session request; (d) analyzing the response of the selected server, to provide an analysis result indicative whether the response includes code to be executed by the client and includes at least one instruction that facilitates sending, by the client, another request, to receive a service from a server out of the plurality of servers; (e) modifying, based on the analysis result, the code by adding information that will cause the client to send a selected server identifier in association to the sending of the other request; and (f) sending a modified response to the client, wherein the modified response includes the modified code.

20 Claims, 4 Drawing Sheets

Related U.S. Application Data continuation of application No. 11/692,942, filed on Mar. 29, 2007.

(60) Provisional application No. 60/888,195, filed on Feb. 5, 2007.

(51) Int. Cl.
*H04L 29/08* (2006.01)
*H04L 29/06* (2006.01)

(52) U.S. Cl.
CPC .......... *H04L 67/141* (2013.01); *H04L 67/146* (2013.01); *H04L 67/34* (2013.01); *H04L 67/42* (2013.01); *H04L 67/1014* (2013.01); *H04L 69/329* (2013.01)

(58) Field of Classification Search
USPC ........ 709/203, 219, 223, 227, 228, 229, 246
See application file for complete search history.

(56) References Cited

U.S. PATENT DOCUMENTS

| | | |
|---|---|---|
| 4,021,782 A | 5/1977 | Hoerning |
| 4,054,951 A | 10/1977 | Jackson et al. |
| 4,316,222 A | 2/1982 | Subramaniam |
| 4,386,416 A | 5/1983 | Giltner et al. |
| 4,593,324 A | 6/1986 | Ohkubo et al. |
| 4,626,829 A | 12/1986 | Hauck |
| 4,701,745 A | 10/1987 | Waterworth |
| 4,862,167 A | 8/1989 | Copeland, III |
| 4,876,541 A | 10/1989 | Storer |
| 4,890,282 A | 12/1989 | Lambert et al. |
| 4,897,717 A | 1/1990 | Hamilton et al. |
| 4,906,991 A | 3/1990 | Fiala et al. |
| 4,971,407 A | 11/1990 | Hoffman |
| 4,988,998 A | 1/1991 | O'Brien |
| 5,003,307 A | 3/1991 | Whiting et al. |
| 5,016,009 A | 5/1991 | Whiting et al. |
| 5,063,523 A | 11/1991 | Vrenjak |
| 5,109,433 A | 4/1992 | Notenboom |
| 5,126,739 A | 6/1992 | Whiting et al. |
| 5,146,221 A | 9/1992 | Whiting et al. |
| 5,150,430 A | 9/1992 | Chu |
| 5,155,484 A | 10/1992 | Chambers, IV |
| 5,167,034 A | 11/1992 | MacLean, Jr. et al. |
| 5,212,742 A | 5/1993 | Normile et al. |
| 5,249,053 A | 9/1993 | Jain |
| 5,280,600 A | 1/1994 | Van Maren et al. |
| 5,287,552 A | 2/1994 | Sasuta et al. |
| 5,293,388 A | 3/1994 | Monroe et al. |
| 5,319,638 A | 6/1994 | Lin |
| 5,341,440 A | 8/1994 | Earl et al. |
| 5,367,629 A | 11/1994 | Chu et al. |
| 5,379,036 A | 1/1995 | Storer |
| 5,410,671 A | 4/1995 | Elgamal et al. |
| 5,414,425 A | 5/1995 | Whiting et al. |
| 5,463,390 A | 10/1995 | Whiting et al. |
| 5,479,587 A | 12/1995 | Campbell et al. |
| 5,488,364 A | 1/1996 | Cole |
| 5,504,842 A | 4/1996 | Gentile |
| 5,506,944 A | 4/1996 | Gentile |
| 5,539,865 A | 7/1996 | Gentile |
| 5,542,031 A | 7/1996 | Douglass et al. |
| 5,544,290 A | 8/1996 | Gentile |
| 5,546,395 A | 8/1996 | Sharma et al. |
| 5,546,475 A | 8/1996 | Bolle et al. |
| 5,553,160 A | 9/1996 | Dawson |
| 5,553,242 A | 9/1996 | Russell et al. |
| 5,610,905 A | 3/1997 | Murthy et al. |
| 5,615,287 A | 3/1997 | Fu et al. |
| 5,638,498 A | 6/1997 | Tyler et al. |
| 5,768,445 A | 6/1998 | Troeller et al. |
| 5,768,525 A | 6/1998 | Kralowetz |
| 5,774,715 A | 6/1998 | Madany et al. |
| 5,805,932 A | 9/1998 | Kawashima et al. |
| 5,825,890 A | 10/1998 | Elgamal et al. |
| 5,850,565 A | 12/1998 | Wightman |
| 5,874,907 A | 2/1999 | Craft |
| 5,884,269 A | 3/1999 | Cellier et al. |
| 5,892,847 A | 4/1999 | Johnson |
| 5,898,837 A | 4/1999 | Guttman et al. |
| 5,923,873 A | 7/1999 | Massey et al. |
| 5,941,988 A | 8/1999 | Bhagwat et al. |
| 5,951,623 A | 9/1999 | Reynar et al. |
| 5,991,515 A | 11/1999 | Fall et al. |
| 6,023,722 A | 2/2000 | Colyer |
| 6,052,785 A | 4/2000 | Lin et al. |
| 6,061,454 A | 5/2000 | Malik et al. |
| 6,070,179 A | 5/2000 | Craft |
| 6,182,139 B1 | 1/2001 | Brendel |
| 6,185,221 B1 | 2/2001 | Aybay |
| 6,223,287 B1 | 4/2001 | Douglas et al. |
| 6,226,687 B1 | 5/2001 | Harriman et al. |
| 6,253,226 B1 | 6/2001 | Chidambaran et al. |
| 6,253,260 B1 | 6/2001 | Beardsley et al. |
| 6,298,380 B1 | 10/2001 | Coile et al. |
| 6,356,951 B1 | 3/2002 | Gentry, Jr. |
| 6,363,411 B1 | 3/2002 | Dugan et al. |
| 6,367,009 B1 | 4/2002 | Davis et al. |
| 6,370,584 B1 | 4/2002 | Bestavros et al. |
| 6,389,468 B1 | 5/2002 | Muller et al. |
| 6,411,986 B1 | 6/2002 | Susai et al. |
| 6,418,483 B2 | 7/2002 | Nilsson |
| 6,425,005 B1 | 7/2002 | Dugan et al. |
| 6,434,618 B1 | 8/2002 | Cohen et al. |
| 6,438,705 B1 | 8/2002 | Chao et al. |
| 6,452,915 B1 | 9/2002 | Jorgensen |
| 6,460,120 B1 | 10/2002 | Bass et al. |
| 6,473,802 B2 | 10/2002 | Masters |
| 6,542,950 B1 | 4/2003 | Bodnar |
| 6,584,567 B1 | 6/2003 | Bellwood et al. |
| 6,590,588 B2 | 7/2003 | Lincke et al. |
| 6,590,885 B1 | 7/2003 | Jorgensen |
| 6,594,246 B1 | 7/2003 | Jorgensen |
| 6,625,150 B1 | 9/2003 | Yu |
| 6,628,629 B1 | 9/2003 | Jorgensen |
| 6,629,163 B1 | 9/2003 | Balassanian |
| 6,633,835 B1 | 10/2003 | Moran et al. |
| 6,643,259 B1 | 11/2003 | Borella et al. |
| 6,643,701 B1 | 11/2003 | Aziz et al. |
| 6,650,640 B1 | 11/2003 | Muller et al. |
| 6,654,701 B2 | 11/2003 | Hatley |
| 6,665,725 B1 | 12/2003 | Dietz et al. |
| 6,668,327 B1 | 12/2003 | Prabandham et al. |
| 6,674,717 B1 | 1/2004 | Duong-van et al. |
| 6,681,232 B1 | 1/2004 | Sistanizadeh et al. |
| 6,681,327 B1 | 1/2004 | Jardin |
| 6,697,363 B1 | 2/2004 | Carr |
| 6,697,378 B1 | 2/2004 | Patel |
| 6,718,388 B1 | 4/2004 | Yarborough et al. |
| 6,754,662 B1 | 6/2004 | Li |
| 6,754,831 B2 | 6/2004 | Brownell |
| 6,760,782 B1 | 7/2004 | Swales |
| 6,763,384 B1 | 7/2004 | Gupta et al. |
| 6,766,373 B1 | 7/2004 | Beadle et al. |
| 6,768,716 B1 | 7/2004 | Abel et al. |
| 6,768,726 B2 | 7/2004 | Dorenbosch et al. |
| 6,772,107 B1 | 8/2004 | La Cascia, Jr. et al. |
| 6,789,203 B1 | 9/2004 | Belissent |
| 6,792,461 B1 | 9/2004 | Hericourt |
| 6,799,276 B1 | 9/2004 | Belissent |
| 6,829,238 B2 | 12/2004 | Tokuyo et al. |
| 6,831,923 B1 | 12/2004 | Laor et al. |
| 6,842,462 B1 | 1/2005 | Ramjee et al. |
| 6,854,117 B1 | 2/2005 | Roberts |
| 6,865,185 B1 | 3/2005 | Patel et al. |
| 6,895,443 B2 | 5/2005 | Aiken |
| 6,928,082 B2 | 8/2005 | Liu et al. |
| 6,934,260 B1 | 8/2005 | Kanuri |
| 6,934,848 B1 | 8/2005 | King et al. |
| 6,950,434 B1 | 9/2005 | Viswanath et al. |
| 6,954,462 B1 | 10/2005 | Chu et al. |
| 6,954,780 B2 | 10/2005 | Susai et al. |

(56) References Cited

U.S. PATENT DOCUMENTS

| | | |
|---|---|---|
| 6,957,272 B2 | 10/2005 | Tallegas et al. |
| 6,963,972 B1 | 11/2005 | Chang et al. |
| 6,990,592 B2 | 1/2006 | Richmond et al. |
| 7,013,338 B1 | 3/2006 | Nag et al. |
| 7,013,342 B2 | 3/2006 | Riddle |
| 7,023,804 B1 | 4/2006 | Younes et al. |
| 7,032,048 B2 | 4/2006 | Appleby et al. |
| 7,047,315 B1 | 5/2006 | Srivastava |
| 7,051,330 B1 | 5/2006 | Kaler et al. |
| 7,058,699 B1 | 6/2006 | Chiou et al. |
| 7,065,526 B2 | 6/2006 | Wissner et al. |
| 7,069,325 B1 | 6/2006 | Lu et al. |
| 7,069,438 B2 | 6/2006 | Balabine et al. |
| 7,085,236 B2 | 8/2006 | Oldak et al. |
| 7,099,926 B1 | 8/2006 | Ims et al. |
| 7,103,045 B2 | 9/2006 | Lavigne et al. |
| 7,113,993 B1 | 9/2006 | Cappiello et al. |
| 7,130,964 B2 | 10/2006 | Ims et al. |
| 7,139,792 B1 | 11/2006 | Mishra et al. |
| 7,139,811 B2 | 11/2006 | Lev Ran et al. |
| 7,177,311 B1 | 2/2007 | Hussain et al. |
| 7,181,493 B2 | 2/2007 | English et al. |
| 7,181,731 B2 | 2/2007 | Pace et al. |
| 7,215,637 B1 | 5/2007 | Ferguson et al. |
| 7,225,249 B1 | 5/2007 | Barry et al. |
| 7,231,445 B1 | 6/2007 | Aweya et al. |
| 7,231,657 B2 | 6/2007 | Honarvar et al. |
| 7,251,218 B2 | 7/2007 | Jorgensen |
| 7,254,639 B1 | 8/2007 | Siegel et al. |
| 7,266,613 B1 | 9/2007 | Brown et al. |
| 7,280,471 B2 | 10/2007 | Rajagopal et al. |
| 7,287,077 B2 | 10/2007 | Haugh et al. |
| 7,296,076 B1 | 11/2007 | Portolani |
| 7,313,627 B1 | 12/2007 | Noble |
| 7,315,513 B2 | 1/2008 | McCann et al. |
| 7,321,926 B1 | 1/2008 | Zhang et al. |
| 7,324,447 B1 | 1/2008 | Morford |
| 7,340,521 B1 | 3/2008 | Karandikar et al. |
| 7,350,229 B1 | 3/2008 | Lander |
| 7,359,974 B1 | 4/2008 | Quinn et al. |
| 7,362,762 B2 | 4/2008 | Williams, Jr. et al. |
| 7,379,882 B2 | 5/2008 | Adams et al. |
| 7,409,450 B2 | 8/2008 | Jorgensen |
| 7,421,515 B2 | 9/2008 | Marovich |
| 7,454,500 B1 | 11/2008 | Hsu et al. |
| 7,463,637 B2 | 12/2008 | Bou-Diab et al. |
| 7,478,162 B2 | 1/2009 | Roadknight et al. |
| 7,484,011 B1 | 1/2009 | Agasaveeran et al. |
| 7,496,750 B2 | 2/2009 | Kumar et al. |
| 7,500,158 B1 | 3/2009 | Smith et al. |
| 7,529,867 B2 | 5/2009 | McCrory et al. |
| 7,571,313 B2 | 8/2009 | Messerges et al. |
| 7,586,851 B2 | 9/2009 | Panigrahy et al. |
| 7,596,137 B2 | 9/2009 | Bennett |
| 7,599,283 B1 | 10/2009 | Varier et al. |
| 7,602,785 B2 | 10/2009 | Dharmapurikar et al. |
| 7,619,983 B2 | 11/2009 | Panigrahy |
| 7,624,436 B2 | 11/2009 | Balakrishnan et al. |
| 7,660,793 B2 | 2/2010 | Indeck et al. |
| 7,664,833 B2 | 2/2010 | Shoolman et al. |
| 7,681,203 B2 | 3/2010 | Mandato et al. |
| 7,698,398 B1 | 4/2010 | Lai |
| 7,711,857 B2 | 5/2010 | Balassanian |
| 7,721,084 B2 | 5/2010 | Salrninen et al. |
| 8,009,566 B2 | 8/2011 | Zuk et al. |
| 8,270,413 B2 | 9/2012 | Weill et al. |
| 8,380,855 B2 | 2/2013 | Bryce et al. |
| 8,584,131 B2 | 11/2013 | Wong et al. |
| 8,623,468 B2 | 1/2014 | Lin et al. |
| 2001/0032254 A1 | 10/2001 | Hawkins |
| 2001/0049741 A1 | 12/2001 | Skene et al. |
| 2002/0025036 A1 | 2/2002 | Sato |
| 2002/0054567 A1 | 5/2002 | Fan |
| 2002/0055980 A1 | 5/2002 | Goddard |
| 2002/0059428 A1 | 5/2002 | Susai et al. |
| 2002/0062389 A1 | 5/2002 | Vertes |
| 2002/0073223 A1 | 6/2002 | Darnell et al. |
| 2002/0083132 A1 | 6/2002 | Holland et al. |
| 2002/0083166 A1 | 6/2002 | Dugan et al. |
| 2002/0085587 A1 | 7/2002 | Mascolo |
| 2002/0099696 A1 | 7/2002 | Prince |
| 2002/0099737 A1 | 7/2002 | Porter et al. |
| 2002/0101822 A1 | 8/2002 | Ayyagari et al. |
| 2002/0103663 A1 | 8/2002 | Bankier et al. |
| 2002/0107903 A1 | 8/2002 | Richter et al. |
| 2002/0126671 A1 | 9/2002 | Ellis et al. |
| 2002/0133586 A1 | 9/2002 | Shanklin et al. |
| 2002/0141393 A1 | 10/2002 | Eriksson et al. |
| 2002/0147916 A1 | 10/2002 | Strongin et al. |
| 2002/0152305 A1 | 10/2002 | Jackson et al. |
| 2002/0169980 A1 | 11/2002 | Brownell |
| 2002/0194345 A1 | 12/2002 | Lu et al. |
| 2003/0014538 A1 | 1/2003 | Roadknight et al. |
| 2003/0018827 A1 | 1/2003 | Guthrie et al. |
| 2003/0028642 A1 | 2/2003 | Agarwal et al. |
| 2003/0033351 A1 | 2/2003 | Ricciardi |
| 2003/0043755 A1 | 3/2003 | Mitchell |
| 2003/0050974 A1 | 3/2003 | Mani-Meitav et al. |
| 2003/0061256 A1 | 3/2003 | Mathews et al. |
| 2003/0061367 A1 | 3/2003 | Shah |
| 2003/0069973 A1 | 4/2003 | Ganesan et al. |
| 2003/0097460 A1 | 5/2003 | Higashiyama et al. |
| 2003/0097484 A1 | 5/2003 | Bahl |
| 2003/0110230 A1 | 6/2003 | Holdsworth et al. |
| 2003/0112755 A1 | 6/2003 | McDysan |
| 2003/0120593 A1 | 6/2003 | Bansal et al. |
| 2003/0123447 A1 | 7/2003 | Smith |
| 2003/0126029 A1 | 7/2003 | Dastidar et al. |
| 2003/0139183 A1 | 7/2003 | Rantalainen |
| 2003/0139975 A1 | 7/2003 | Perkowski |
| 2003/0140366 A1 | 7/2003 | Conkling et al. |
| 2003/0154406 A1 | 8/2003 | Honarvar et al. |
| 2003/0169859 A1 | 9/2003 | Strathmeyer et al. |
| 2003/0172164 A1 | 9/2003 | Coughlin |
| 2003/0177267 A1 | 9/2003 | Orava et al. |
| 2003/0179738 A1 | 9/2003 | Diachina et al. |
| 2003/0214948 A1 | 11/2003 | Jin et al. |
| 2003/0217171 A1 | 11/2003 | Von Stuermer et al. |
| 2003/0223413 A1 | 12/2003 | Guerrero |
| 2003/0225859 A1 | 12/2003 | Radia et al. |
| 2003/0235204 A1 | 12/2003 | Azevedo et al. |
| 2004/0004975 A1 | 1/2004 | Shin et al. |
| 2004/0006638 A1 | 1/2004 | Oberlander et al. |
| 2004/0008629 A1 | 1/2004 | Rajagopal et al. |
| 2004/0008664 A1 | 1/2004 | Takahashi et al. |
| 2004/0008728 A1 | 1/2004 | Lee |
| 2004/0010473 A1 | 1/2004 | Hsu et al. |
| 2004/0010544 A1 | 1/2004 | Slater et al. |
| 2004/0015686 A1 | 1/2004 | Connor et al. |
| 2004/0037322 A1 | 2/2004 | Sukonik et al. |
| 2004/0052257 A1 | 3/2004 | Abdo et al. |
| 2004/0078491 A1 | 4/2004 | Gormish et al. |
| 2004/0088585 A1 | 5/2004 | Kaler et al. |
| 2004/0095934 A1 | 5/2004 | Cheng et al. |
| 2004/0148425 A1 | 7/2004 | Haumont et al. |
| 2004/0148602 A1 | 7/2004 | Ottati |
| 2004/0193513 A1 | 9/2004 | Pruss et al. |
| 2004/0218603 A1 | 11/2004 | Lee et al. |
| 2004/0225810 A1 | 11/2004 | Hiratsuka |
| 2004/0230747 A1 | 11/2004 | Ims et al. |
| 2004/0240446 A1 | 12/2004 | Compton |
| 2005/0021713 A1 | 1/2005 | Dugan et al. |
| 2005/0060295 A1 | 3/2005 | Gould et al. |
| 2005/0063303 A1 | 3/2005 | Samuels et al. |
| 2005/0063307 A1 | 3/2005 | Samuels et al. |
| 2005/0074007 A1 | 4/2005 | Samuels et al. |
| 2005/0088976 A1 | 4/2005 | Chafle et al. |
| 2005/0108420 A1 | 5/2005 | Brown et al. |
| 2005/0114700 A1 | 5/2005 | Barrie et al. |
| 2005/0132060 A1 | 6/2005 | Mo et al. |
| 2005/0135436 A1 | 6/2005 | Nigam et al. |
| 2005/0144278 A1 | 6/2005 | Atamaniouk |
| 2005/0171930 A1 | 8/2005 | Arning et al. |
| 2005/0187979 A1 | 8/2005 | Christensen et al. |

(56) References Cited

U.S. PATENT DOCUMENTS

| | | |
|---|---|---|
| 2005/0203988 A1 | 9/2005 | Nollet et al. |
| 2005/0216555 A1 | 9/2005 | English et al. |
| 2005/0238010 A1 | 10/2005 | Panigrahy et al. |
| 2005/0238011 A1 | 10/2005 | Panigrahy |
| 2005/0238012 A1 | 10/2005 | Panigrahy et al. |
| 2005/0238022 A1 | 10/2005 | Panigrahy |
| 2005/0240745 A1 | 10/2005 | Iyer et al. |
| 2005/0265235 A1 | 12/2005 | Accapadi et al. |
| 2005/0271048 A1 | 12/2005 | Casey |
| 2006/0005008 A1 | 1/2006 | Kao |
| 2006/0020598 A1 | 1/2006 | Shoolman et al. |
| 2006/0026290 A1 | 2/2006 | Pulito et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031442 A1 | 2/2006 | Ashley et al. |
| 2006/0036747 A1 | 2/2006 | Galvin et al. |
| 2006/0037071 A1 | 2/2006 | Rao et al. |
| 2006/0056443 A1 | 3/2006 | Tao et al. |
| 2006/0104294 A1 | 5/2006 | Yoo |
| 2006/0123226 A1 | 6/2006 | Kumar et al. |
| 2006/0153228 A1 | 7/2006 | Stahl et al. |
| 2006/0159077 A1 | 7/2006 | Vanecek |
| 2006/0165223 A1 | 7/2006 | Dugan et al. |
| 2006/0233166 A1 | 10/2006 | Bou-Diab et al. |
| 2006/0235973 A1 | 10/2006 | McBride et al. |
| 2006/0242300 A1 | 10/2006 | Yumoto et al. |
| 2006/0265689 A1 | 11/2006 | Kuznetsov et al. |
| 2006/0294366 A1 | 12/2006 | Nadalin et al. |
| 2007/0094336 A1 | 4/2007 | Pearson |
| 2007/0121615 A1 | 5/2007 | Weill et al. |
| 2007/0153798 A1 | 7/2007 | Krstulich |
| 2007/0156919 A1 | 7/2007 | Potti et al. |
| 2007/0162494 A1 | 7/2007 | Schneider |
| 2007/0208946 A1 | 9/2007 | Baby et al. |
| 2008/0034127 A1 | 2/2008 | Nishio |
| 2008/0104591 A1 | 5/2008 | McCrory et al. |
| 2008/0114710 A1 | 5/2008 | Pucher |
| 2008/0114724 A1 | 5/2008 | Indeck et al. |
| 2008/0253366 A1 | 10/2008 | Zuk et al. |
| 2008/0291910 A1 | 11/2008 | Tadimeti et al. |
| 2009/0063852 A1 | 3/2009 | Messerges et al. |
| 2009/0077618 A1 | 3/2009 | Pearce et al. |
| 2009/0295905 A1 | 12/2009 | Civanlar et al. |
| 2009/0327113 A1 | 12/2009 | Lee et al. |
| 2012/0036227 A1 | 2/2012 | Kleinfelter et al. |

OTHER PUBLICATIONS

G. Pujolle, A. Serhrouchni and I. Ayadi, "Secure session management with cookies," 2009 7th International Conference on Information, Communications and Signal Processing (ICICS), Macau, 2009, pp. 1-6.*
K. Gutzmann, "Access control and session management in the HTTP environment," in IEEE Internet Computing, vol. 5, No. 1, pp. 26-35, Jan./Feb. 2001.*
Official Communication for U.S. Appl. No. 12/108,525 dated Nov. 21, 2013.
Official Communication for U.S. Appl. No. 12/199,768 dated Dec. 16, 2013.
"BIG-IP Controller With Exclusive OneConnect Content Switching Feature Provides a Breakthrough System for Maximizing Server and Network Performance," F5 Networks, Inc., Press Release, May 8, 2001, accessed Jun. 4, 2002, 3 pages.
"Consistent Flashing," Wikipedia—the free encyclopedia, http://en.wikipedia.org/w/index.php?title=Consistent_hashing&print . . . , accessed Jul. 25, 2008, 1 page.
"Control Plane," Wikipedia—the free encyclopedia, http://en.wikipedia.org/w/index.php?title=Control_plane&printable=yes, accessed Jul. 31, 2008, 4 pages.
"Data Compression Applications and Innovations Workshop," Proceedings of a Workshop held in conjuction with the IEEE Data Compression Conference, Mar. 31, 1995, 123 pages.
"Direct Access Storage Device Compression and Decompression Data Flow," IBM Technical Disclosure Bulletin, vol. 38, No. 11, Nov. 1995, pp. 291-295.
"Drive Image Professional for DOS, OS/2 and Windows," WSDC Download Guide, http://wsdcds01.watson.ibm.com/WSDC.nsf/Guides/Download/Applications-DriveImage.htm, accessed Nov. 22, 1999, 4 pages.
"Drive Image Professional," WSDC Download Guide, http://wsdcds01.watson.ibm.com/wsdc.nsf/Guides/Download/Applications-DriveImage.htm, accessed May 3, 2001, 5 pages.
"editcap—Edit and/or translate the format of capture files," ethereal.com, www.ethereal.com/docs/man-pages/editcap.1.html, accessed Apr. 15, 2004, 3 pages.
"Ethereal—Interactively browse network traffic," ethereal.com, www.ethereal.com/docs/man-pages/ethereal.1.html, accessed Apr. 15, 2004, 29 pages.
"FAQ: Network Intrusion Detection Systems," robertgraham.com, Mar. 21, 2000, www.robertgraham.com/pubs/network-intrusion-detection.html, accessed Apr. 15, 2004.
"Forwarding Plane." Wikipedia—the free encyclopedia. http://en.wikipedia.org/w/index.php?title=Forwarding_plane&printa . . . , accessed Jul. 31, 2008.
"IBM Announces New Feature for 3480 Subsystem," Tucson Today, vol. 12, No. 337, Jul. 25, 1989, 1 page.
"IBM Technology Products Introduces New Family of High-Performance Data Compression Products," IBM Corporation, Somers, NY, Aug. 16, 1993, 6 pages.
"Magstar and IBM 3590 High Performance Tape Subsystem Technical Guide," IBM, Nov. 1996, 287 pages.
"Network Management," Wikipedia—the free encyclopedia, http://en.wikipedia.org/w/index.php?title=Network_management&pr . . . , accessed Jul. 31, 2008, 3 pages.
"Network Sniffer," linuxmigration.com, www.linuxmigration.com/quickref/admin/ethereal.html, accessed Apr. 15, 2004, 4 pages.
"Telecommunications Network," Wikipedia—the free encyclopedia, http://en.wikipedia.org/w/index.php?title=Telecommunications_net . . . , accessed Jul. 31, 2008, 2 pages.
"Tethereal—Dump and analyze network traffic," ethereal.com, www.ethereal.com/docs/man-pages/tethereal.1.html, accessed Apr. 15, 2004,11 pages.
About Computing & Technology, "Wireless/Networking, Nagle algorithm," visited Dec. 6, 2005, 2 pages, http://compnetworking.about.com/od/tcpip/l/bldef_nagle,htm.
Acharya et al., "Scalable Web Request Routing with MPLS," IBM Research Report, IBM Research Division, Dec. 5, 2001.
Adaptive Lossless Data Compression—ALDC, IBM, Jun. 15, 1994, 2 pages.
ALDC-MACRO—Adaptive Lossless Data Compression, IBM Microelectronics, May 1994, 2 pages.
ALDC1-20S—Adaptive Lossless Data Compression, IBM Microelectronics, May 1994, 2 pages.
ALDC1-40S—Adaptive Lossless Data Compression, IBM Microelectronics, May 1994, 2 pages.
ALDC1-5S—Adaptive Lossless Data Compression, IBM Microelectronics, May 1994, 2 pages.
Australia's Academic and Research Network, "Programs and large MTU, Nagle algorithm," visited Dec. 9, 2005, 3 pages, http://www.aarnet.edu.au/engineering/networkdesign/mtu/programming.html.
Berners-Lee, T. et al., "Uniform Resource Identifiers (URI): Generic Syntax," IETF RFC 2396, Aug. 1998.
Berners-Lee, T. et al., RFC 1945, "Hypertext Transfer Protocol—HTTP/1.0," May 1996, 60 pages.
Braden, R., "Requirements for Internet Hosts," RFC 1122, Oct. 1989, 101 pages.
Bryhni et al., "A Comparison of Load Balancing Techniques for Scalable Web Servers," IEEE Network, Jul./Aug. 2000, pp. 58-64.
Castineyra, I. et al., "The Nimrod Routing Architecture," RFC 1992, Aug. 1996, 27 pages.
Cheng, J.M. et al., "A Fast, Highly Reliable Data Compression Chip and Algorithm for Storage Systems," IBM, vol. 40, No. 6, Nov. 1996, 11 pages.

(56) References Cited

OTHER PUBLICATIONS

Costlow, T., "Sony Designs Faster, Denser Tape Drive," Electronic Engineering Times, May 20, 1996, 2 pages.
Craft, D. J., "A Fast Hardware Data Compression Algorithm and Some Algorithmic Extensions," IBM Journal of Research and Development, vol. 42, No. 6, Nov. 1998, 14 pages.
Craft, D. J., "Data Compression Choice No Easy Call," Computer Technology Review, Jan. 1994, 2 pages.
Degermark, M. et al., "Low-Loss TCP/IP Header Compression for Wireless Networks," J.C. Baftzar AG, Science Publishers, Oct. 1997, pp. 375-387.
Dierks, T. et al., RFC 2246, "The TLS Protocol, Version 1.0," Jan. 1999, 80 pages.
Electronic Engineering Times, Issue 759, Aug. 16, 1993, 37 pages.
Electronic Engineering Times, Issue 767, Oct. 11, 1993, 34 pages.
Enger, R., et al., "FYI on a Network Management Tool Catalog: Tools for Monitoring and Debugging TCP/IP Internets and Interconnected Devices," RFC 1470, Jun. 1993, 52 pages.
F5 Networks Delivers Blistering Application Traffic Management Performance and Unmatched Intelligence via New Packet Velocity ASIC, and BIG-IP Platforms, F5 Networks, Inc. Press Release dated Oct. 21, 2002, 3 pages.
Fielding, R. et al., RFC 2616, "Hypertext Transfer Protocol—HTTP/1.1," Jun. 1999, 114 pages.
Fielding. R. et aL, "Hypertext Transfer Protocol—HTTP/1.1," Network Working Group, RFC 2068, Jan. 1997, 152 pages.
fifi.org, "Manpage of TCP," visited Dec. 9, 2005, 6 pages, http://www.fiff.org/cgi-bin/man2html/usr/share/man/man7/tcp.7.gz.
Freier, A. et al., "The SSL Protocol Version 3.0," IETF, Internet Draft, Nov. 18, 1996, 60 pages.
Freier, A. et al., Netscape Communications Corporation, "The SSL Protocol, Version 3.0," Mar. 1996, 60 pages.
Hewtt. J. R. et al., "Securities Practice and Electronic Technology," Corporate Securities Series, (New York: Law Journal Seminars-Press) 1998, title page, bibliography page, pp. 4.29-4.30.
Hinden, R. et al., "Format for Literal IPv6 Addresses in URL's," IETF RFC 2732, Dec. 1999.
Office Communication for U.S. Appl. No. 12/271,903 dated Jul. 8, 2010.
Office Communication for U.S. Appl. No. 12/271,903 dated Jan. 25, 2011.
Office Communication for U.S. Appl. No. 12/271,903 dated Oct. 26, 2011.
Office Communication for U.S. Appl. No. 12/271,903 dated Oct. 16, 2013.
Office Communication for U.S. Appl. No. 12/271,903 dated Jul. 3, 2012.
Office Communication for U.S. Appl. No. 12/271,903 dated Jul. 10, 2014.
Office Communication for U.S. Appl. No. 12/271,903 dated Oct. 23, 2014.
Office Communication for U.S. Appl. No. 12/271,903 dated Mar. 30, 2015.
Office Communication for U.S. Appl. No. 12/108,525 dated May 8, 2015.
Office Communication for U.S. Appl. No. 11/692,942 dated May 20, 2015.
Abhari, A. et al., "HTTP Modification to Reduce Client Latency," Electrical and Computer Engineering, 2008. CCECE 2008, pp. 001491-001496, May 4-7, 2008.
Liu, H. et al., "Modeling Response Time of SOAP Over Http," Web Services, 2005. ICWS 2005. Proceedings. 2005 IEEE International Conference on Web Services, Jul. 11-15, 2005 (7 pages).
Gutzmann, "Access control and session management in the HTTP environment," Internet Computing, IEEE, vol. 5, No. 1, pp. 26,35. Jan./Feb. 2001.
Lin et al. "Direct Web switch routing with state migration, TCP masquerade and cookie name rewriting," Global Telecommunications Conference, 2003. GLOBECOM '03. IEEE, vol. 7, pp. 3663,3667, Dec. 1-5, 2003.

Hochmuth, P., "F5, CacheFlow Pump Up Content-Delivery Lines," NetworkWorld, May 4, 2001, http://www.network.com/news/2001/0507cachingonline.html, accessed Jun. 1, 2005, 3 pages.
Housley, R., et al., "Internet X.509 Public Key Infrastructure Certificate and CRL Profile," RFC 2459, Jan. 1999, 115 pages.
IBM Microelectronics Comdex Fall 1993 Booth Location, 1 page.
IP Multimedia Subsystem, http://en.wikipedia.org/w/index.php?title=IP_Multimedia_Subsyst . . . , accessed May 15. 2008, 8 pages.
Jacobson, V. et al., "TCP Extensions for High Performance," May 1992, http://www.faqs.org/rfcs/rfc1323.html, pp. 1-37.
Kessler, G. et al., RFC 1739, "A Primer on Internet and TCP/IP Tools," Dec. 1994, 46 pages.
Mapp, G., "Transport Protocols—What's wrong with TCP," Jan. 28, 2004, LCE Lecture at: http://www-Ice.eng.cam.ac.uk/-gem11, 4F5-Lecture4.pdf, pp. 1-60.
Nagle, J., RFC 896, "Congestion control in IP/TCP internetworks," Jan. 6, 1984, 13 pages.
Nielsen. H. F. et al., "Network Performance Effects of HTTP/1.1, CSS1, and PNG," Jun. 24, 1997, W3 Consortium, http://www.w3.org/TR/nOTE-pipelining-970624$Id:Pipeline.html, v 1.48 199/10/18 19:38:45 root Exp $, pp. 1-19.
OpenSSL, visited Apr. 12, 2006, 1 page, www.openssl.org.
Oracle Communication and Mobility Server, Aug. 2007, http://www.oracle.com/technology/products/ocms/otn_front.html, accessed May 15, 2008, 108 pages.
Paxson, V., RFC 2525, "Known TCP Implementation Problems," Mar. 1999, 61 pages.
POSTEL, J., "Transmission Control Protocol," Sep. 1981, Information Sciences Institute, University of Southern California, Marina del Rey, California, http://www.faqs.org/rfcs/rfc793.html, pp. 1-21.
Readme, Powerquest Corporation, 1994-2002, 6 pages.
Reardon, M., "A Smarter Session Switch: Arrowpoint's CS Session Switches Boast the Brains Needed for E-Commerce," Data Communications, Jan. 1999, title page, pp. 3, 5, 18.
Rescorla, E. "SSL and TLS, Designing and Building Secure Systems", 2001, Addison-Vesley, 46 pages.
RSA Laboratories, "PKCS #1 v2.0: RSA Cryoptography Standard," Oct. 1, 1998, 35 pages.
Schneider, K. et al. "PPP for Data Compression in Data Circuit-Terminating Equipment (DCE)," RFC 1976, Aug. 1996m 10 pages.
Schroeder et al., "Scalable Web ServerClustering Technologies," IEEE Network May/Jun. 2000, pp. 38-45.
SearchNetworking.com, "Nagle's algorithm," visited Dec. 6, 2005, 3 pages, http://searchnetworking.techtarget.com/sDefinition/0,,sid7_gci754347,00.html.
Secure and Optimize Oracle 11i E-Business Suite with F5 Solutions, F5 Application Ready Network Guide, Oracle E-Business Suite 11i, Aug. 2007, 2 pages.
Session initiation Protocol, http://en.wikipedia.org/w/index.php?title=Session_Initiation_Protoc . . . , accessed May 14, 2008, 5 pages.
Simpson, W. "The Point-To-Point Protocol (PPP)," RFC 1661, Jul. 1994, 54 pages.
Stevens, W. R., "TCP/IP Illustrated," vol. 1: The Protocols, Addison-Wesley Professional, Dec. 31, 1993, pp. 1-17.
Stevens, W., "TCP Slow Start, Congestion Avoidance, Fast Retransmit, and Fast Recovery Algorithms," Jan. 1997, Sunsite.dk, http://rfc.sunsite.dk/rfc/rfc2001.html, pp. 1-6.
Tormasov, A. et al., "TCP/IP options for high-performance data transmission," visited Dec. 9, 2005, 4 pages, http://builder.com.com/5100-6732-1050878.html.
Using the Universal Inspection Engine, Manual Chapter: BIG-IP Solutions Guide v4.6.2: Using the Universal Inspection Engine, 2002, 8 pages.
Valloppillil, V. et al., "Cache Array Routing Protocol v1.0," Feb. 1998, http://icp.ircache.net/carp.txt, accessed Jul. 25, 2008, 7 pages.
W3C, "HTTP/1.1 and Nagle's Algorithm," visited Dec. 6, 2005, 3 pages, http://www.w3.org/Protocols/HTTP/Performance/Nagle/.
Zebrose, K. L., "Integrating Hardware Accelerators into Internetworking Switches," Telco Systems, Nov. 1993, 10 pages.

(56) References Cited

OTHER PUBLICATIONS

Fielding, R. et al "Hypertext Transfer Protocol—HTTP/1.1," W3 Consortium, Jun. 1999, pp. 1-176 (165 pages), http://www.w3.org/Protocols/rfc2616/rfc2616.html.
Official Communication for U.S. Appl. No. 13/615,007 dated Jan. 7, 2014.
Official Communication for U.S. Appl. No. 12/199,768 dated Jun. 18. 2010.
Official Communication for U.S. Appl. No. 12/199,768 dated Nov. 22, 2010.
Official Communication for U.S. Appl. No. 11/692,942 dated Oct. 10, 2014.
Elnikety et al., "A Method for Transparent Admission Control and Request Scheduling in E-Commerce Websites," WWW2004, May 17-22, 2004, pp. 276-286.8.
Heiss et al., "Adaptive Load Control in Transaction Processing Systems," Proceedings of the 17th International Conference on Very Large Data Bases, Barcelona, Sep. 1991, pp. 47-54.
Zilberstein et al., "Discovering Pair Motif Phrases: An Efficient Branch and Bound Approacfh." BIONFORMATICS, vol. 00, No. 00, 2006, pp. 1-10.
Office Communication for U.S. Appl. No. 12/108,525 dated May 14, 2014.
Office Communication for U.S. Appl. No. 12/108,525 dated Jul. 24, 2014.
Office Communication for U.S. Appl. No. 11/692,942 dated Dec. 19, 2013.
Office Communication for U.S. Appl. No. 11/692,942 dated Apr. 8, 2014.
"An Overview of the Acceleration and Optimization of Web-based Applications," White Paper, Crescendo Networks, Apr. 2005, pp. 1-8.
"AppBeat™ Suite: Multi-Tier Application Delivery," White Paper, Crescendo Networks, 2008, pp. 1-11.
"BEA Tuxedo: Installing the BEA Tuxedo System, Version 10.0," BEA, Sep. 28, 2007, pp. 1-200.
"Crescendo Networks: Products: Features," Crescendo Networks, Feb. 22, 2007, pp. 1-4 http://web.archive.org/web/20070305005434/www.crescendonetworks.com/engsite/content/T1.asp?Sid=4&pid=58.
"Maestro AFE CN-5000E/CN-5500E User Guide, Software Version 4.2," Crescendo Networks, Apr. 1, 2007, pp. 1-233.
"Oracle Application Server, Performance Guide, 10g Release 3 (10.1.3)," Oracle, Jun. 2006, pp. 1-158.
Baker, Z., "Efficient Algorithms and Architectures for High-speed Text Processing and Data Correlation," Ph.D. Dissertation Proposal, University of Southern California, Dec. 6, 2004, pp. 1-22.
Chao, G., "An entropy-based stability QoS routing with priority scheduler in MANET using fuzzy controllers," Journal of Communication and Computer, vol. 4, No. 3, Mar. 2007, pp. 52-54.
Derbal, Y., "Entropic Grid Scheduling," Journal of Grid Computing, vol. 4, 2006, pp. 373-394.
Duffy, K. et al., "Using estimated entropy in a queueing system with dynamic routing," Markov Process and Related Fields, vol. 13, No. 1, Nov. 2005, pp. 57-84.
Feldman, D., "A Brief Introduction to: information Theory, Excess Entropy and Computational Mechanics," Apr. 1998, revised Oct. 2002, pp. 1-49.
Heikinheimo, H. et al., "Finding Low-Entropy Sets and Trees from Binary Data," KDD'07, Aug. 2007, pp. 1-10.

Hyun, J. et al., "Content Sniffer Based Load Distribution in a Web Server Cluster," IEICE Transactions on Information and Systems, vol. E86-D, No. 7, Jul. 2003, pp. 1258-1269.
Internet Archive Wayback Machine, "www.crescendonetworks.com," Jul. 8, 2010 http://web.archive.org/web/*/http://www.crescendonetworks.com/.
Keane, T., "A General-Purpose Heterogeneous Distributed Computing System," Masters Thesis, National University of Ireland Maynooth, Jul. 2004, pp. 1-124.
Meng, X. et al., "An Adaptive Data Prefetching Scheme for Biosequence Database Search on Reconfigurable Platforms," SAC'07, ACM, Mar. 11-15, 2007, pp. 140-141.
Park, S.-M. et al., "Chameleon: A Resource Scheduler in a Data Grid Environment," Proceedings of the IEEE/ACM International Symposium on Cluster Computing and the Grid (CCGRID.03), 2003, pp. 1-8.
Phillis, Y.A. et al., "An Entropy Approach to Queueing Control," Proceedings of the 34th Conference on Decision & Control, Dec. 1995, pp. 3644-3647.
Shuo, D. et al., "Request Dispatching Algorithms for Web Server Clusters Based on Load Balancing," Tsinghua Science and Technology, vol. 4, No. 4, Dec. 1999, pp. 1620-1623.
Sun, B. et al., "An Entropy-Based Stability QoS Routing with Priority Scheduler in MANET Using Fuzzy Controllers," FSKD 2006, LNAI 4223, 2006, pp. 735-738.
Szajda, D. et al., "Toward a Practical Data Privacy Scheme for a Distributed Implementation of the Smith-Waterman Genome Sequence Comparison Algorithm," Proceedings of the 2006 ISOC Network and Distributed System Security Symposium (NDSS 2006), 2006, pp. 253-265.
Tsiantos, V. D. et al., "Information Theoretic Decomposition of GE-Type Closed Queueing Networks with Finite Capacity and Multiple Servers," UKPEW, 1999, pp. 1-12.
Official Communication for U.S. Appl. No. 11/692,942 dated Sep. 10, 2010.
Official Communication for U.S. Appl. No. 11/692,942 dated Jul. 26, 2011.
Official Communication for U.S. Appl. No. 11/692,942 dated Aug. 26, 2013.
Official Communication for U.S. Appl. No. 12/108,525 dated Aug. 25, 2010.
Official Communicatiion for U.S. Appl. No. 12/108,525 dated Mar. 28, 2011.
Official Communication for U.S. Appl. No. 12/108,525 dated May 8, 2015, 21 pages.
Official Communication for U.S. Appl. No. 11/692,942 dated May 20, 2015, 8 pages.
Official Communication for U.S. Appl. No. 11/692,942 dated Feb. 2, 2016, 10 pages.
Official Communication for U.S. Appl. No. 12/108,525 dated Nov. 23, 2015, 22 pages.
Official Communication for U.S. Appl. No. 12/108,525 dated Feb. 18, 2016, 3 pages.
Official Communication for U.S. Appl. No. 12/108,525 dated Sep. 9, 2016, 23 pages.
Official Communication for U.S. Appl. No. 11/692,942 dated Oct. 20, 2016, 9 pages.
Official Communication for U.S. Appl. No. 11/692,942 dated Jun. 28, 2017, 11 pages.
Official Communication for U.S. Appl. No. 12/108,525 dated Mar. 22, 2017, 24 pages.
Official Communication for U.S. Appl. No. 11/692,942 dated Jan. 6, 2017, 3 pages.

* cited by examiner

METHOD, INTERMEDIATE DEVICE AND COMPUTER PROGRAM CODE FOR MAINTAINING PERSISTENCY

RELATED APPLICATIONS

The present application is a Continuation Patent Application of U.S. patent application Ser. No. 12/271,903, filed on Nov. 16, 2008, entitled "METHOD, INTERMEDIATE DEVICE AND COMPUTER PROGRAM CODE FOR MAINTAINING PERSISTENCY," which is a Continuation Patent Application of U.S. patent application Ser. No. 11/692,942, filed on Mar. 29, 2007, entitled "METHOD, INTERMEDIATE DEVICE AND COMPUTER PROGRAM CODE FOR MAINTAINING PERSISTENCY," which is a Non-Provisional Patent Application of U.S. Patent Provisional Application Ser. No. 60/888,195, filed on Feb. 5, 2007, entitled "METHOD, INTERMEDIATE DEVICE AND COMPUTER PROGRAM CODE FOR MAINTAINING PERSISTENCY," all of which are further incorporated herein by reference in their entirety.

FIELD OF THE INVENTION

This application relates to dynamically changing browser code by an intermediate unit and especially relates to a method, an intermediate device and a computer program code for maintaining server persistency.

BACKGROUND OF THE INVENTION

Maintaining server persistency in web-based environment is a well known requirement for every web-based property that would like to maintain clients' sessions' context for environments with multiple identical web-servers, as the underline HTTP protocol is stateless by its nature. This mechanism is usually implemented by Application Delivery Controller (ADC) internal or external to the servers. One of the main duties of ADC is to balance the load between multiple, function-identical servers. With ADC, these servers look like a single high-powered computing resource that allows many clients to access it simultaneously, and then balances the load between these function-identical web-servers. Few existing load-balancing mechanisms are known in the art and will not be described by this paper. When an ADC is configured to work with persistency, it guarantees that client's consecutive requests which belong to the same session will follow the same destination server as the first session request. The following main techniques are available today for achieving this functionality: (i) maintaining session persistency by source IP address, (ii) maintaining session persistency by HTTP session cookie, (iii) Maintaining session persistency by adding session identifier to URI part of the URL; and (IV) maintaining session persistency using a URL identifier.

Maintaining session persistency by source IP address—in this case the ADC looks for the source IP address of the client (the source IP address appears in every TCP/IP packet that carries HTTP traffic) and forwards all the requests which are coming from the same IP address to the same destination web-server. This method is poorly working when many users are accessing the same web-based application through Mega-Proxy server(s) (e.g. AOL service provider users). Mega-Proxy/proxy server replaces the client source IP addresses with its own addresses pool, thus forcing the ADC to forward all the clients to the same web-server, thus creating unbalanced environment.

Maintaining session persistency by HTTP session cookie—cookie is a well-know mechanism for maintaining session states by the web-server. When a web-server sets a session cookie in a response to a client request, the client is forced (by his/her browser software) to send this cookie header for every consecutive request to the same domain/site during that session. An ADC which sits between the server and the client can trace/modify/add a dedicated cookie header on the server response, in-order to signal itself to which server to forward the next requests from that particular client on the way back. Although this method is commonly used, it doesn't solve the issue of persistency when cookie mechanism is disabled by the client. A description of this method can be found in U.S. Pat. No. 6,473,802 which is incorporated herein by reference.

Maintaining session persistency by adding a session identifier to URI part of URL—when cookie isn't supported by the client, the web-server (by adjusting its code) can add session identifier to the URI part of the URL in every HTML response it sends. The ADC then traces the session identifier on the server response and saves this information in its internal memory together with the identifier of the server from which the response has come. Upon receiving the next request from the client, the ADC matches the URL identifier with those which are stored in its memory and forwards the request to the designated server which appears in its memory. This method will only work when the server code is adjusted to add URL identifier for every URL in the HTML response, and it significantly increases the processing overhead of the web-server. The method of maintaining session persistency without client supported cookie is described by U.S. Pat. No. 7,296,076 of Portolani which is incorporated herein by reference.

Maintaining session persistency using a URL identifier—this method is a combination of methods 2 and 3 above, whether or not the client supports cookie, the persistency is achieved by adding server identifier to every URL in the HTML server response. On the first client's request the ADC selects one server out of plurality of servers according to its load-balancing algorithm, and then later adds this server identifier to all the URLs which appear on the server's HTML response. The next coming requests from this particular client will include the server identifier, as part of the URL, to which the request should be forwarded to; the ADC then deletes this identifier, to prevent unexpected server behavior, and forwards the request according to the deleted server identifier value. An example of how to maintain persistency using URL identifier can be found in US patent application publication serial number 2003/0163586 of Schnetzler.

Method 4 above, does not address the issue of persistency in modern web-based environments where server's responses include browser code program, such as Java Script, Flash, Silvertight, AJAX, etc. These browser codes hide the URLs that will be sent by the client's browser program in a non-standard way, e.g. every browser code programmer can select his/her own way of writing the code, making the response URL modification task impossible.

SUMMARY THE INNOVATION

The present invention provides methods and intermediate devices as described in the accompanying claims. Specific embodiments of the invention are set forth in the dependent claims. These and other aspects of the invention will be apparent from and elucidated with reference to the embodiments described hereinafter.

The present invention provides methods and intermediate devices as described in the accompanying claims. Specific embodiments of the invention are set forth in the dependent claims. These and other aspects of the invention will be apparent from and elucidated with reference to the embodiments described hereinafter.

A method for maintaining server persistency, the method includes: receiving, by an intermediate entity, a first session request from client to receive a service from a server out of a plurality of servers that are coupled to the intermediate entity; selecting a server out of the plurality of servers and directing to the selected server information indicative of the first session request; receiving a response of the selected server to the information indicative of the first session request; analyzing the response of the selected server, to provide an analysis result indicative whether the response comprises code to be executed by the client and comprises at least one instruction that facilitates sending, by the client, another request to receive a service from a server out of the plurality of servers of the same site (plurality of servers that reside on the same site); modifying, in response to the analysis result, the code by adding information that will cause the client to send a selected server identifier in association to the sending of the other request; and sending a modified response to the client, wherein the modified response comprises the modified code.

The method can include analyzing the response of the selected server to locate browser code to be executed by a browser of the client.

The method can include analyzing the response of the selected server to locate at least one instruction that is executed by a browser of the client and includes a call to an entity to enable sending the other request, wherein the entity is selected from a group consisting of an operating system of the client and an API layer between the browser code and the operating system of the client.

The method can include adding an HTTP header for each call instruction of the code, wherein each HTTP header includes the selected server identifier, if the other request and the modified response are associated with a same site.

The method can include receiving, by the intermediate node, the other request from the client; removing the selected server identifier to provide a modified other request; and sending to the selected server information indicative of the modified other request.

The method can include receiving a selected server response that includes compressed code; de-compressing the compressed code to provide de-compressed code; wherein the analyzing includes analyzing the de-compressed code; wherein the modifying includes modifying, in response to the analysis result, the de-compressed code by adding information that will cause the client to send a selected server identifier in association to the sending of the other request; compressing the modified de-compressed code to provide a compressed modified code; and sending a modified response to the client, wherein the modified response includes the compressed modified code.

The method can include receiving a selected server response that includes encrypted code; decrypting the encrypted code to decrypted code; wherein the analyzing includes analyzing the decrypted code; wherein the modifying includes modifying, in response to the analysis result, the decrypted code by adding information that will cause the client to send a selected server identifier in association to the sending of the other request; encrypting the modified decrypted code to provide an encrypted modified code; and sending a modified response to the client, wherein the modified response includes the encrypted modified code.

The method can include modifying, in response to the analysis result, the code by adding information that will cause the client to send a selected server identifier in association to the sending of the other request if the other request and the modified response are associated with a same site.

An intermediate device, including: a client interface configured to receive a first session request from client to receive a service from a server out of a plurality of servers; a server selector configured to select a server out of the plurality of servers; a server interface, coupled to the plurality of servers and configured to direct to the selected server information indicative of the first session request and to receive a response of the selected server to the information indicative of the first session request; an analyzer configured to analyze the response of the selected server, to provide an analysis result indicative whether the response includes code to be executed by the client and includes at least one instruction that facilitates sending, by the client, another request to receive a service from a server out of the plurality of servers; a modifier configured to modify, in response to the analysis result, the code by adding information that will cause the client to send a selected server identifier in association to the sending of the other request and wherein the client interface is further adapted to send a modified response to the client, wherein the modified response includes the modified code.

The analyzer is configured to analyze the response of the selected server to locate browser code to be executed by a browser of the client.

The analyzer is configured to analyze the response of the selected server to locate at least one instruction that is executed by a browser of the client and includes a call to an entity to enable sending the other request, wherein the entity is selected from a group consisting of an operating system of the client and an API layer between the browser code and the operating system of the client.

The modifier is configured to add an HTTP header for each call instruction of the code, if the other request and the modified response are associated with a same site, wherein each added HTTP header includes the selected server identifier.

The client interface is configured to receive, by the intermediate node, the other request from the client; wherein the modifier is configured to remove the selected server identifier to provide a modified other request; and the client interface is configured to send to the selected server information indicative of the modified other request.

The intermediate device can include a de-compressor and a compressor; wherein the server interface is configured to receive a selected server response that includes compressed code; wherein the de-compressor is configured to de-compress the compressed code to provide decompressed code; wherein the compressor is configured to compress decompressed modified code received from the modifier to provide a compressed modified code; and wherein the client interface is configured to send a modified response to the client, wherein the modified response includes the compressed modified code.

The intermediate device can include a decryptor and a encryptor; wherein the server interface is configured to receive a selected server response that includes encrypted code; wherein the decryptor is configured to decrypt the encrypted code to provide decrypted code; wherein the encryptor is configured to decrypt decrypted modified code received from the modifier to provide an encrypted modified code; and wherein the client interface is configured to send a modified response to the client, wherein the modified response includes the encrypted modified code.

The intermediate device can include a modifier that is configured to modify, in response to the analysis result, the code by adding information that will cause the client to send a selected server identifier in association to the sending of the other request if the other request and the modified response are associated with a same site.

A computer program product that includes a computer readable non-transitory medium that stores instructions for: receiving, by an intermediate entity, a first session request from client to receive a service from a server out of a plurality of servers that are coupled to the intermediate entity; selecting a server out of the plurality of servers and directing to the selected server information indicative of the first session request; receiving a response of the selected server to the information indicative of the first session request; analyzing the response of the selected server, to provide an analysis result indicative whether the response includes code to be executed by the client and includes at least one instruction that facilitates sending, by the client, another request to receive a service from a server out of the plurality of servers of the same site; modifying, in response to the analysis result, the code by adding information that will cause the client to send a selected server identifier in association to the sending of the other request and sending a modified response to the client, wherein the modified response includes the modified code.

The computer program product can include a computer readable medium that stores instructions for analyzing the response of the selected server to locate browser code to be executed by a browser of the client.

The computer program product can include a computer readable medium that stores instructions for analyzing the response of the selected server to locate at least one instruction that is executed by a browser of the client and includes a call to an operating system of the client to enable sending the other request.

The computer program product can include a computer readable medium that stores instructions for adding an HTTP header for each call instruction of the code, if the other request and the modified response are associated with a same site, wherein each HTTP header includes the selected server identifier.

The computer program product can include a computer readable medium that stores instructions for: receiving, by the intermediate node, the other request from the client; removing the selected server identifier to provide a modified other request; and sending to the selected server information indicative of the modified other request.

The computer program product can include a computer readable medium that stores instructions for: receiving a selected server response that includes compressed code; de-compressing the compressed code to provide de-compressed code; analyzing the de-compressed code; modifying, in response to the analysis result, the de-compressed code by adding information that will cause the client to send a selected server identifier in association to the sending of the other request; compressing the modified de-compressed code to provide a compressed modified code: and sending a modified response to the client, wherein the modified response includes the compressed modified code.

The computer program product can include a computer readable medium that stores instructions for: receiving a selected server response that includes encrypted code; decrypting the encrypted code to decrypted code; analyzing the decrypted code; modifying, in response to the analysis result, the decrypted code by adding information that will cause the client to send a selected server identifier in association to the sending of the other request; encrypting the modified decrypted code to provide an encrypted modified code; and sending a modified response to the client, wherein the modified response includes the encrypted modified code.

The computer program product can include a computer readable medium that stores instructions for modifying, in response to the analysis result, the code by adding information that will cause the client to send a selected server identifier in association to the sending of the other request if the other request and the modified response are associated with a same site.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

It has been shown that persistency can be maintained when a server response includes client code. By modifying the code the client, when executing the code, sends in association with a request to obtain a service from a server, a server identifier that identifies the server that was selected to provide a response.

Conveniently, the method can be executed without using dedicated HTTP cookies.

According to an embodiment of the invention, on the first client request (to receive a service from a server) an intermediate entity (such as but not limited to an application delivery controller—ADC) selects a selected server (for example—by applying a load balancing algorithm) to which the request should be forwarded to. When the response of the selected server (selected server response) is received by the intermediate entity it analyzes the response to determine whether a certain code is included in the server response (The certain code includes one or more instructions that facilitate sending, by the client, another request to receive a service from a server out of the plurality of servers of the same site). If the answer is negative the response is sent (conveniently without being modified) to the client. If the analysis indicates that the selected server response includes the certain code then the intermediate entity modifies that certain code by adding information that will cause the client to send a selected server identifier in association to the sending of the other request. A modified response that includes the modified code is sent to the client.

Figure 1:
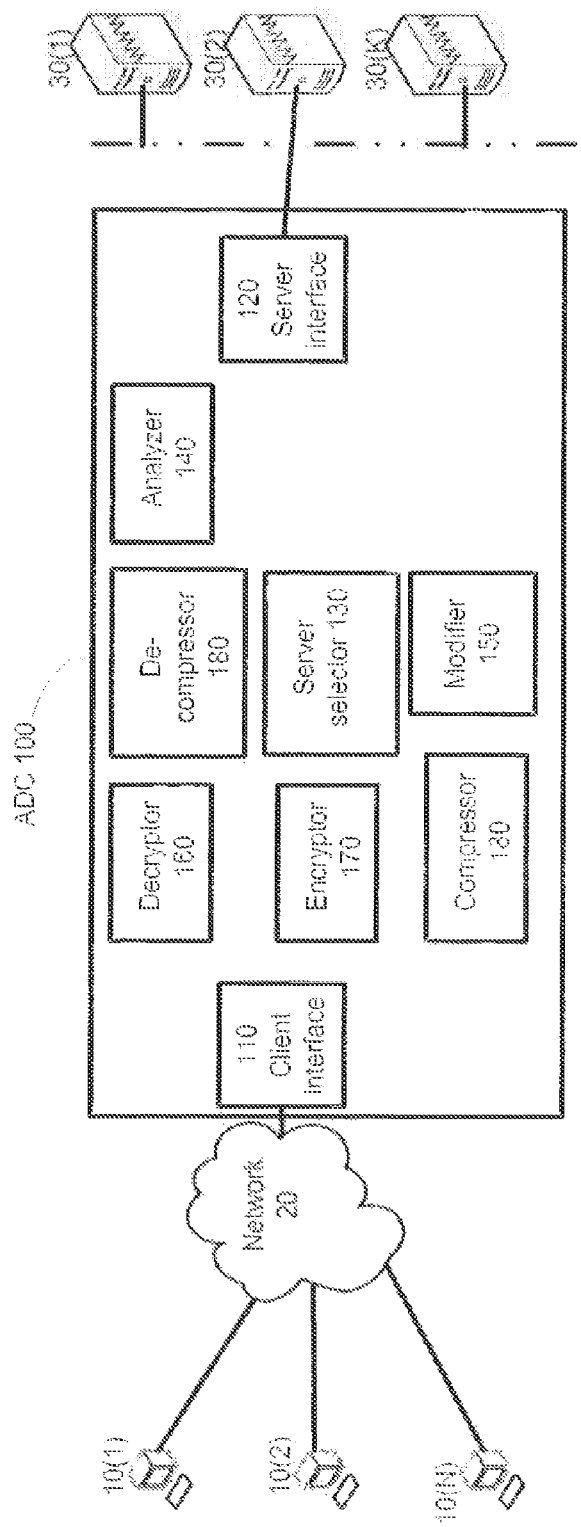
FIG. 1 illustrates an intermediate entity such as application delivery controller, clients, network and multiple servers according to an embodiment of the invention.

FIG. 1 illustrates an intermediate device such as application delivery controller (ADC) 100, clients 10(1)-10(n), network 20, and multiple servers 30(1)-30(k), according to an embodiment of the invention.

ADC 100 is connected to multiple servers 30(1)-30(k) via server interface 120 and is connected via client interface 110 and network 20 to clients 10(1)-10(n).

ADC 100 includes, in addition to server interface 120 and client interface 110, server selector 130, analyzer 140, modifier 150, decryptor 160, encryptor 170, de-compressor 180 and compressor 190. It is noted that each of these modules can include hardware, software or a combination thereof. It is further noted that some modules (such as decryptor 160, encryptor 170, de-compressor 180 and compressor 190) are optional.

Client interface 110 receives a request from a client to receive a service from a server out of servers 30(1)-30(k). After a connection was established with a client, that client can send a first session request (which conveniently refers to the first session request of a client session) or additional session requests. A first session request after the establishment of the session requires an allocation of a server out of servers 30(1)-30(k) while other requests follow the allocation. The other requests include a unique server identifier that is indicative of a server (out of servers 30(1)-30(k) that was previously selected by ADC 100. The client sends the unique server identifier inside the following requests based on the modified response code that was sent to it by ADC 100.

The service requested by the client can involve sending information to the client from the server, executing a program by the server, sending to the client web pages, and the like.

In order to determine whether a received request is the first session request, client interface 110 sends it to analyzer 140.

Analyzer 140 that can determine whether a server was already assigned to respond to the client by searching the unique server identifier. If such unique server identifier exists, ADC 100 sends the request to the selected server associated with the unique server identifier; otherwise, the request is sent to server selector 130.

Server selector 130 is configured to select a server out of plurality of servers 30(1)-30(k). It can apply a load balancing algorithm, but this is not necessarily so.

Once the selection of the selected server is made, server selector 130 sends an indication to server interface 120 that directs information indicative of the first session request to the selected server. The information can be the first session request itself but this is not necessarily so.

The selected server (out of servers 30(1)-30(k)) then sends to ADC 100 a selected server response (responsive to the information sent from ADC 100) that is received by server interface 120.

The selected server response is sent to analyzer 140 that is configured to analyze the response of the selected server and to provide an analysis result. The analysis result indicates the selected server response includes code to be executed by the client and includes at least one instruction that facilitates sending, by the client, another request to receive a service from a server out of the plurality of servers. If such a code is included in the selected server response than the code is sent to modifier 150.

Analyzer 140 can include an application parser engine that parses the code as well as determines whether the code should de-compressed (by de-compressor 180) or decrypted (by decryptor 160) before being modified by modifier 150.

Modifier 150 is configured to modify the code, in response to the analysis result, by adding information that will cause the client to send a selected server identifier in association to the sending of the other request. According to an embodiment of the invention, modifier 150 is configured to modify, in response to the analysis result, the code by adding information that will cause the client to send the selected server identifier in association to the sending of the other request if it is destined to the same site from which the modified response has been received. Modifier 150 can include a browser code engine that can amend the code to include information that will cause the client to send a selected server identifier in association to the sending of the other request. The information can include one or more instructions, one of more data fields (such as a HTTP header) and the like. Modifier can include a browser code engine that can add a HTTP ServerID header to the browser code, whenever the browser code sends request to a web site that can be serviced by the selected browser.

Modifier 150 can, for example, parse the browser code and mark all the locations where the browser should call the client's operating system (or an API layer between the browser code and the operating system of the client) for sending HTTP requests. In these locations modifier 150 adds a unique HTTP header for each of these calls that will be sent to the client with the next requests and includes a selected server identifier that will signal to ADC 100 which is the selected server. According to an embodiment of the invention, the modifier adds the HTTP header if the request is destined to the same site from which the modified response has been received.

It is noted that, conveniently, the modification of the code is only applied to the cases where the browser code sends request to the site where the ADC is installed. When the code sends requests to other sites the code modification is conveniently not applied.

Modifier 150 outputs a modified response that is sent by client interface 110 to the client.

Modifier 150 can be configured to modify the code, in response to the analysis result, by adding information that will cause the client to send a selected server identifier in association to the sending of the other request if the other request and the modified response are associated with the same site (or group of associated addresses). For example—if the other request is destined to the site from which the modified response has been received.

According to various embodiments of the invention ADC 100 also includes decryptor 160, encryptor 170, de-compressor 180 and compressor 190.

Decryptor 160 can decrypt an encrypted selected server response or at least an encrypted code within the selected server response to provide a decrypted code. The decrypted code can then be sent to analyzer 140 and/or to modifier 150. Encryptor 170 can encrypt a modified response or at least a modified code. The encrypted modified code can then be sent (within a modified response) to the client.

Decryptor 160 and encryptor 170 can be included within an SSL Engine, but this is not necessarily so.

De-compressor 180 can de-compress a compressed selected server response or at least a compressed code within the selected server response to provide a de-compressed code. The de-compressed code can then be sent to analyzer 140 and/or to modifier 150. Compressor 190 can compress a modified response or at least a modified code. The compressed modified code can then be sent (within a modified response) to the client.

It is noted that ADC 100 can apply both compression and encryption of code. For example, it can decrypt and de-compress code and send it to modifier 150 (or analyzer 140) and then compress and encrypt the modified code.

ADC 100 can include additional modules such as communication modules (including but not limited to a L2 switching module, an L3 routing module, a TCP termination engine) responsive to managing the communication between clients and servers.

According to various embodiments of the invention ADC 100 can also apply at least one prior art method for managing requested server requests that do not include code. It can, for example, maintain session persistency by using a URL identifier.

Figure 2:
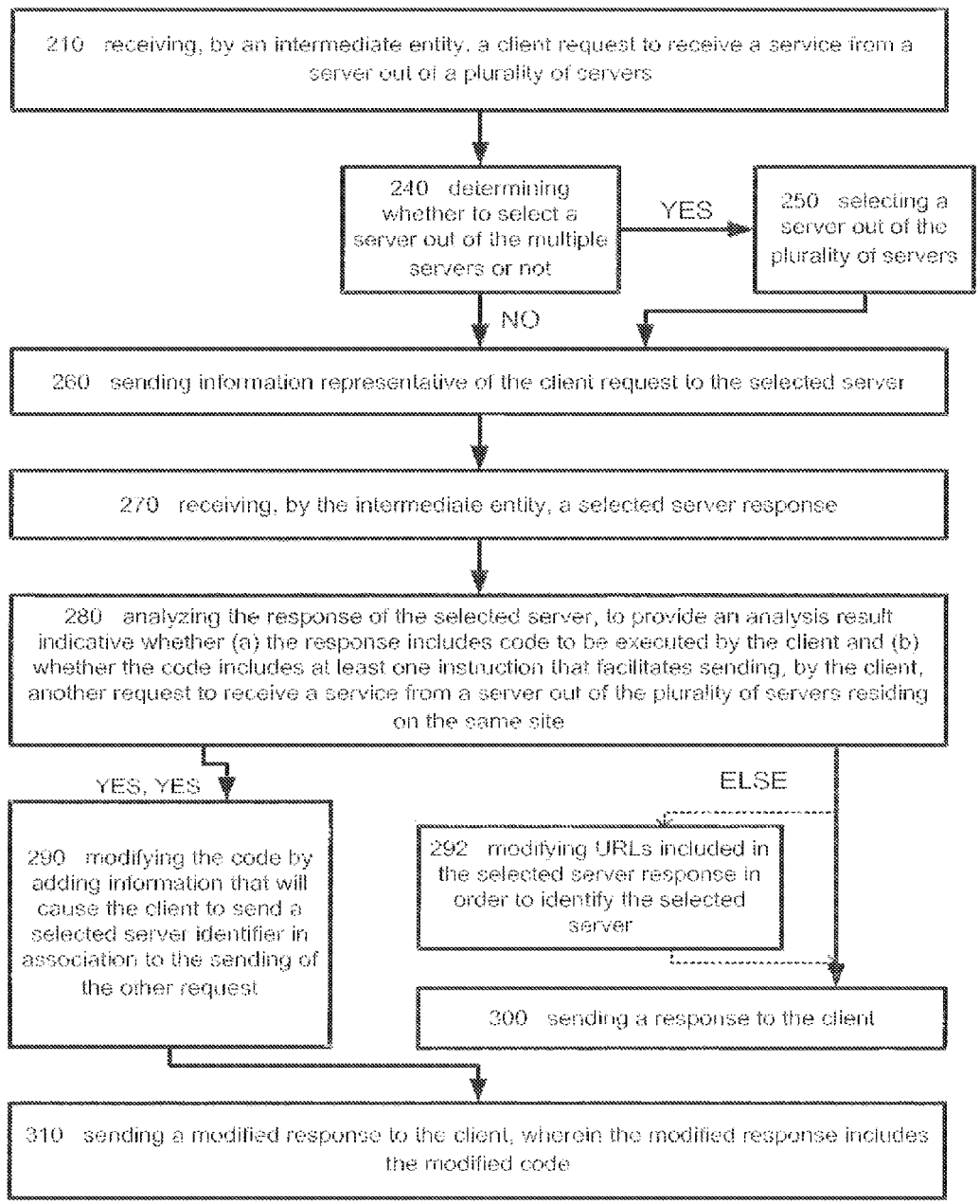
FIG. 2 illustrates a method for maintaining server persistency, according to an embodiment of the invention.

FIG. 2 illustrates method 200 for maintaining server persistency, according to an embodiment of the invention.

Method 200 starts by stage 210 of receiving, by an intermediate entity, from a client a request to receive a service from a server out of a plurality of servers. The intermediate entity is connected between one or more clients and one or more servers.

Stage 210 is followed by stage 240 of determining whether to select a server out of the multiple servers or not. Stage 240 includes determining whether the request includes a server identifier that identifies one of the multiple servers. If such an identifier exists then information representing the request is sent to that server. This can occur if the request is not the first session request from the client after a session with the client was established—where a selection of a selected server has already occurred.

If the answer is positive—a server identifier exists—then stage 240 is followed by stage 260 of sending information representative of the request to the selected server. Stage 260 can also include removing the server identifier before sending the information to the selected server.

If the answer is negative—a server identifier does not exist—then stage 240 is followed by stage 250 of selecting a server out of the plurality of servers. Stage 250 is followed by stage 260 of sending to the selected server information indicative of the request.

Stage 260 is followed by stage 270 of receiving, by the intermediate entity, a selected server response—a response of the selected server to the information indicative of the request.

Stage 270 is followed by stage 280 of analyzing the response of the selected server, to provide an analysis result indicative whether the response includes code to be executed by the client and whether the code includes at least one instruction that facilitates sending, by the client, another request to receive a service from a server out of the plurality of servers. If the answer to both questions is positive then stage 280 is followed by stage 290. Else, stage 280 is followed by stage 300 of sending a response to the client.

Stage 280 of analyzing can include locating browser code to be executed by a browser of the client and especially (but not solely) locating at least one instruction that is executed by a browser of the client and includes a call to an operating system of the client to enable sending the other request. The call can be in the form of a send instruction. According to an embodiment of the invention, the call is a call to an entity to enable sending the other request, wherein the entity is selected from a group consisting of an operating system of the client and an API layer between the browser code and the operating system of the client.

Stage 290 includes modifying the code by adding information that will cause the client to send a selected server identifier in association to the sending of the other request. It is noted that according to an embodiment of the invention, the modifying is carried out if the other request is destined to the site from which the modified response has been received.

Stage 290 can include adding an HTTP header for each call instruction of the code, wherein each HTTP header comprises the selected server identifier. According to an embodiment of the invention, the adding of the HTTP header is carried out if the other request is destined to the same site from which the modified response has been received.

It should be noted that conveniently, the modification of the code is only applied to the cases where the browser code sends request to the site where the ADC is installed. When the code sends requests to other sites, the code modification is conveniently not applied.

Stage 290 is followed by stage 310 of sending a modified response to the client, wherein the modified response includes the modified code.

If the request sent by the client is the first session request to receive a service then it is processed by the following stages: (i) receiving, by an intermediate entity, a first session request from client to receive a service from a server out of a plurality of servers that are coupled to the intermediate entity; (ii) selecting a server out of the plurality of servers and directing to the selected server information indicative of the first session request; (iii) receiving a response of the selected server to the information indicative of the first session request; (iv) analyzing the response of the selected server, to provide an analysis result indicative whether the response comprises code to be executed by the client and comprises at least one instruction that facilitates sending, by the client, another request to receive a service from a server out of the plurality of servers; (v) modifying, based on the analysis result (if such a code exists), the code by adding information that will cause the client to send a selected server identifier in association to the sending of the other request; and (vi) sending a modified response to the client, wherein the modified response comprises the modified code.

According to an embodiment of the invention stage 300 can be preceded by stage 292 of modifying URLs included in the selected server response in order to identify the selected server. The modification can include, for example, adding a unique server identifier to the URI of the URL of an HTML response sent to the client. It is noted that in this case the response can include a session identifier (instead of the unique server identifier) that can be mapped, by the intermediate entity to a selected server. In this case the session identifier can be modified.

It should be noted that, according to an embodiment of the invention, in relation to responses which are not a browser code, a wrapper takes every response which isn't a browser code and add to it a wrapper that implement the above, i.e. for every consecutive request that is sent to the server the browser code wrapper adds an HTTP header with ServerID.

Figure 3:
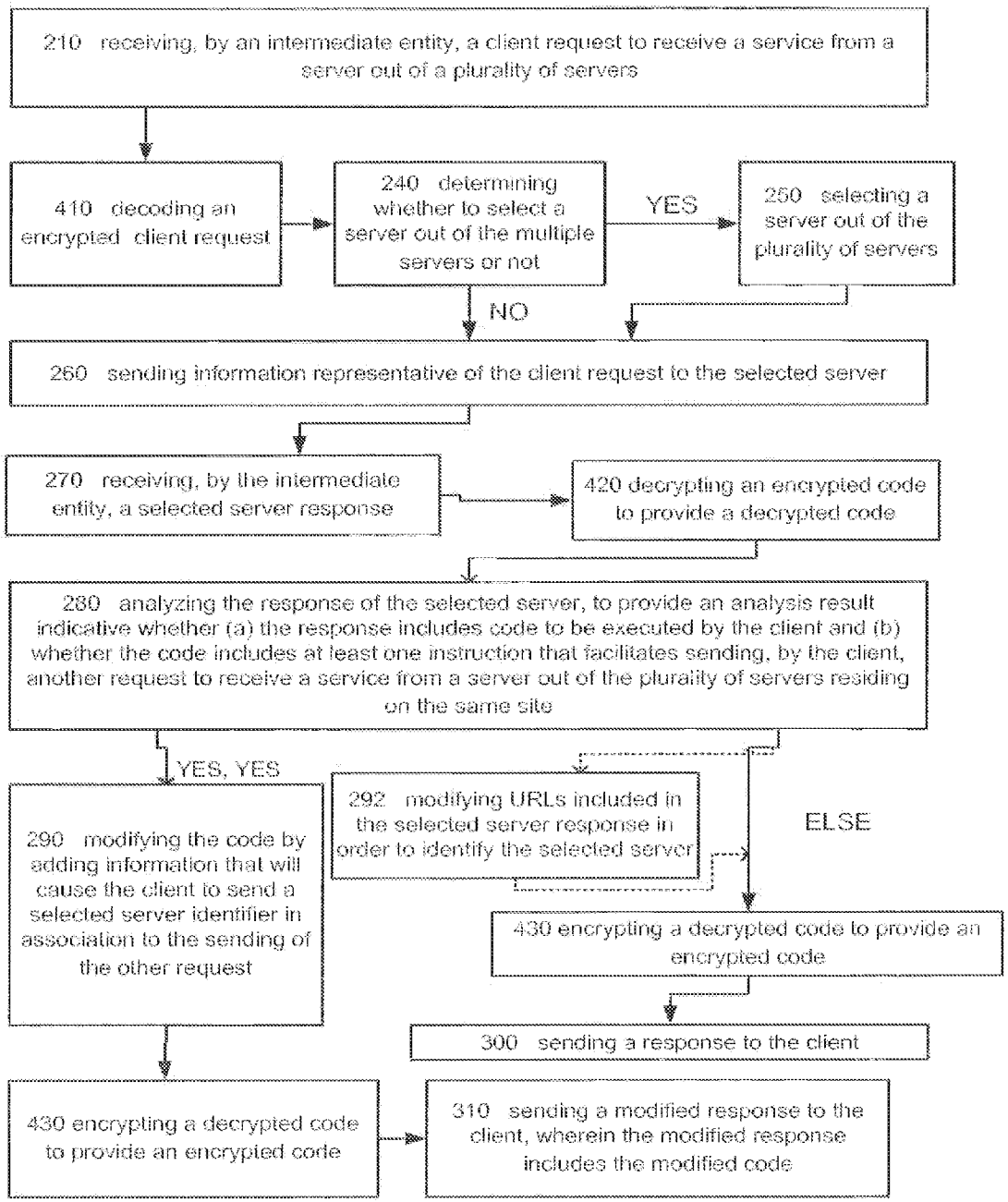
FIG. 3 illustrates a method according to an embodiment of the invention.

FIG. 3 illustrates method 400 according to an embodiment of the invention.

Method 400 differs from method 200 by including stages 410, 420 and 430.

Stage 410 is preceded by stage 210 and is followed by stage 240. Stage 410 includes decoding an encrypted request of the client. Stage 410 can also include decrypting the entire request or a portion thereof.

Stage 420 is preceded by stage 270 and is followed by stage 280. It includes decrypting an encrypted code to provide a decrypted code. The encrypted code is included in a selected server response and stage 420 can include decrypting the selected server response or a portion thereof.

Stage 430 is preceded by stage 290 and is followed by stage 310. It includes encrypting a decrypted code to provide an encrypted code. Stage 430 can also include encrypting the selected server response or a portion thereof. Stage 430 may also be preceded by stage 292 and followed by stage 300.

Applying method 400 can involve: (i) receiving a selected server response that includes encrypted code; (ii) decrypting the encrypted code to provide a decrypted code. In this caste the stage of analyzing includes analyzing the decrypted code and the stage of modifying includes modifying, in response to the analysis result, the decrypted code by adding information that will cause the client to send a selected server identifier in association to the sending of the other request; (iii) encrypting the modified decrypted code to provide an encrypted modified code: and (iv) sending a modified response to the client, wherein the modified response comprises the encrypted modified code.

Figure 4:
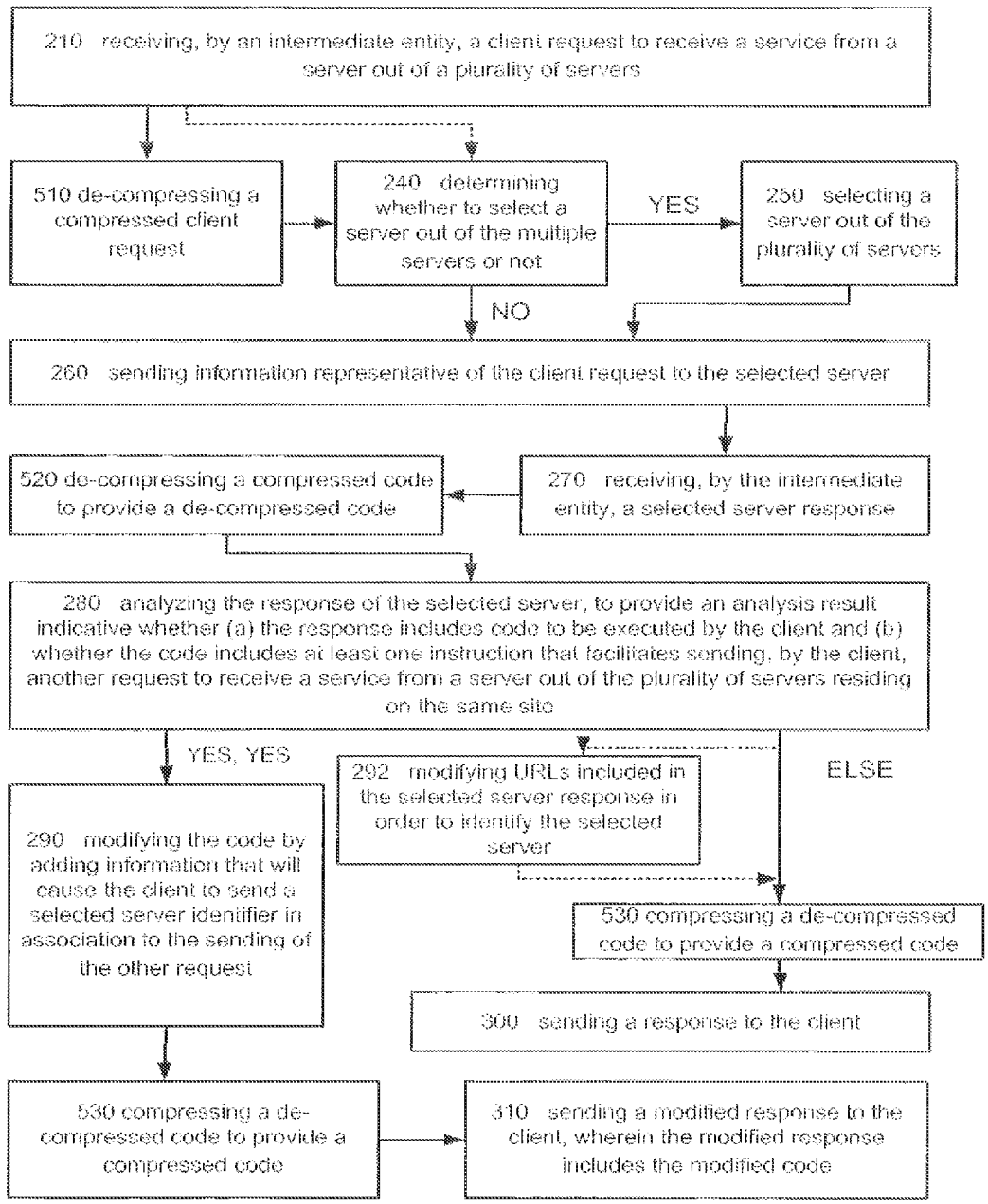
FIG. 4 illustrates a method according to an embodiment of the invention.

FIG. 4 illustrates method 500 according to an embodiment of the invention.

Method 500 differs from method 200 by including stages 510, 520 and 530.

Stage 510 is preceded by stage 210 and is followed by stage 240. Stage 510 includes de-compressing a compressed request of the client. Stage 510 can also include de-compressing the entire request or a portion thereof Stage 520 is preceded by stage 270 and is followed by stage 280. It includes de-compressing a compressed code to provide a de-compressed code. Stage 520 can also include de-compressing the selected server response or a portion thereof.

Stage 530 is preceded by stage 290 and is followed by stage 310. It includes compressing a de-compressed code to provide a compressed code. Stage 530 can also include compressing the selected server response/modified response or a portion thereof. Stage 530 may also be preceded by stage 292 and followed by stage 300.

Method 500 can include: receiving a selected server response that comprises compressed code; de-compressing the compressed code to provide de-compressed code; wherein the analyzing comprises analyzing the de-compressed code; wherein the modifying comprises modifying, based on the analysis result, the de-compressed code by adding information that will cause the client to send a selected server identifier in association to the sending of the other request; compressing the modified de-compressed code to provide a compressed modified code; and sending a modified response to the client, wherein the modified response comprises the compressed modified code.

According to an embodiment of the invention, an example for modifying java-script based browser code is provided:

a. Before:
   objHTTP=new ActiveXObject('Microsoft.XMLHTTP');
   objHTTP.open('POST',"OtherPage.asp",false);
   objHTTP.setRequestHeader('Accept-Encoding','gzip, deflate');
   objHTTP.send b. After:
   objHTTP=new ActiveXObject('Microsoft.XMLHTTP');
   objHTTP.open('POST',"OtherPage.asp",false);
   objHTTP.setRequestHeader('Accept-Encoding','gzip, deflate');
   objHTTP.setRequestHeader('X-Cres-Session-ID','persist-server-3004');
   objHTTP.send According to another embodiment of the invention any of the mentioned above methods, intermediate devices and computer program products can be aimed by a purpose that differs from maintaining a server's persistency. For example they can be applied for improving a user experience.

Conveniently, a combination of either one of the mentioned above methods can be provided. For example, decryption can be applied on client requests or on selected server responses, de-compression operations can be applied on selected server responses and code.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

We claim:

1. A method for maintaining server persistency, comprising:
   receiving, by an intermediate entity, a first session request from client to receive a service from a server out of a plurality of servers that are coupled to the intermediate entity;
   selecting a server out of the plurality of servers and directing to the selected server information indicative of the first session request;
   receiving a response of the selected server to the information indicative of the first session request;
   analyzing the response of the selected server, to provide an analysis result indicative whether the response comprises code to be executed by the client and comprises at least one instruction that facilitates sending, by the client, another request to receive a service from a server out of the plurality of servers;
   modifying the code by adding information that causes the client to send a selected server identifier in association to the sending of the other request, wherein the code is parsed and marked at each location where each call is made to the client, and wherein the information added at each marked location for each call includes a unique HTTP header that includes the selected server identifier independent of a dedicated HTTP cookie; and
   sending a modified response to the client, wherein the modified response comprises the modified code.

2. The method according to claim 1 wherein the method is executed without using dedicated HTTP cookies.

3. The method according to claim 1 comprising analyzing the response of the selected server to locate at least one instruction that is executed by a browser of the client and comprises a call to an entity to enable sending the other request, wherein the entity is selected from a group consisting of an operating system of the client and an API layer between the code and the operating system of the client.

4. The method according to claim 1, comprising adding the HTTP header for each call instruction of the code, wherein each HTTP header comprises the selected server identifier, if the other request and the modified response are associated with a same site.

5. The method according to claim 1 comprising:
receiving, by the intermediate node, the other request from the client;
removing the selected server identifier to provide a modified other request; and
sending to the selected server information indicative of the modified other request.

6. The method according to claim 1 comprising:
receiving a selected server response that comprises compressed code;
de-compressing the compressed code to provide de-compressed code;
wherein the analyzing comprises analyzing the de-compressed code;
wherein the modifying comprises modifying, in response to the analysis result, the decompressed code by adding information that will cause the client to send the selected server identifier in association to the sending of the other request;
compressing the modified de-compressed code to provide a compressed modified code; and
sending a modified response to the client, wherein the modified response comprises the compressed modified code.

7. The method according to claim 1 comprising:
receiving a selected server response that comprises encrypted code;
decrypting the encrypted code to decrypted code;
wherein the analyzing comprises analyzing the decrypted code;
wherein the modifying comprises modifying, in response to the analysis result, the decrypted code by adding information that causes the client to send the selected server identifier in association to the sending of the other request;
encrypting the modified decrypted code to provide an encrypted modified code; and
sending a modified response to the client, wherein the modified response comprises the encrypted modified code.

8. The method according to claim 1, comprising modifying, in response to the analysis result, the code by adding information that will cause the client to send the selected server identifier in association to the sending of the other request if the other request and the modified response are associated with a same site.

9. An intermediate device, comprising:
a memory that stores instructions;
a circuit that executes the stored instructions to provide:
a client interface that receives a first session request from a client to receive a service from a server out of a plurality of servers;
a server selector that selects a server out of the plurality of servers;
a server interface, coupled to the plurality of servers, and directs to the selected server information indicative of the first session request and receives a response of the selected server to the information indicative of the first session request;
an analyzer that analyzes the response of the selected server, to provide an analysis result indicative whether the response comprises code to be executed by the client and comprises at least one instruction that facilitates sending, by the client, another request to receive a service from a server out of the plurality of servers;
a modifier that modifies the code by adding information that causes the client to send a selected server identifier in association to the sending of the other request, wherein the code is parsed and marked at each location where each call is made to the client, and wherein the information added at each marked location for each call includes a unique HTTP header that includes the selected server identifier independent of a dedicated HTTP cookie; and
wherein the client interface sends a modified response to the client that includes the modified code.

10. The intermediate device according to claim 9, wherein the intermediate device is unable to utilize dedicated HTTP cookies.

11. The intermediate device according to claim 9 wherein the analyzer analyzes the response of the selected server to locate at least one instruction that is executed by a browser of the client and comprises a call to an entity to enable sending the other request, wherein the entity is selected from a group consisting of an operating system of the client and an API layer between the code and the operating system of the client.

12. The intermediate device according to claim 9 wherein the modifier adds the HTTP header for each call instruction of the code, if the other request and the modified response are associated with a same site, wherein each added HTTP header comprises the selected server identifier.

13. The intermediate device according to claim 9 wherein the client interface receives, by the intermediate node, the other request from the client; wherein the modifier is configured to remove the selected server identifier to provide a modified other request; and the client interface is configured to send to the selected server information indicative of the modified other request.

14. The intermediate device according to claim 9 comprising a decompressor and a compressor; wherein the server interface is receives a selected server response that comprises compressed code; wherein the de-compressor de-compresses the compressed code to provide decompressed code; wherein the compressor compresses decompressed modified code received from the modifier to provide a compressed modified code; and wherein the client interface sends a modified response to the client, wherein the modified response comprises the compressed modified code.

15. The intermediate device according to claim 9 comprising a decryptor and an encryptor; wherein the server interface receives a selected server response that comprises encrypted code; wherein the decryptor decrypts the encrypted code to provide decrypted code; wherein the encryptor encrypts decrypted modified code received from the modifier to provide an encrypted modified code; and wherein the client interface sends a modified response to the client, wherein the modified response comprises the encrypted modified code.

16. The intermediate device according to claim 9 wherein the modifier modifies, in response to the analysis result, the code by adding information that causes the client to send the selected server identifier in association to the sending of the other request when the other request and the modified response are associated with a same site.

17. A non-transitory computer readable storage medium that stores instructions for execution by a circuit, wherein execution of the instructions performs actions, including:

selecting a server out of the plurality of servers and directing to the selected server information indicative of the first session request;

receiving a response of the selected server to the information indicative of the first session request;

analyzing the response of the selected server, to provide an analysis result indicative whether the response comprises code to be executed by the client and comprises at least one instruction that facilitates sending, by the client, another request to receive a service from a server out of the plurality of servers;

modifying the code by adding information that causes the client to send a selected server identifier in association to the sending of the other request, wherein the code is parsed and marked at each location where each call is made to the client, and wherein the information added at each marked location for each call includes a unique HTTP header that includes the selected server identifier independent of a dedicated HTTP cookie; and sending a modified response to the client, wherein the modified response comprises the modified code.

18. The medium of claim 17, further comprising analyzing the response of the selected server to locate at least one instruction that is executed by a browser of the client and comprises a call to an operating system of the client to enable sending the other request.

19. The medium of claim 17, further comprising adding the HTTP header for each call instruction of the code, when the other request and the modified response are associated with a same site, wherein each HTTP header comprises the selected server identifier.

20. The medium of claim 17, further comprising modifying, in response to the analysis result, the code by adding information that causes the client to send the selected server identifier in association to the sending of the other request when the other request and the modified response are associated with a same site.

* * * * *